United States Patent [19]

Sagane et al.

[11] Patent Number: 4,612,252

[45] Date of Patent: Sep. 16, 1986

[54] LAMINATED STRUCTURE HAVING POST-CHLORINATED ADHESIVE OLEFIN RESIN LAYER

[75] Inventors: Toshihiro Sagane, Yamaguchi; Riichiro Nagano, Hiroshima, both of Japan

[73] Assignee: Mitsui Petrochemical Industries, Ltd., Tokyo, Japan

[21] Appl. No.: 683,168

[22] Filed: Dec. 18, 1984

[30] Foreign Application Priority Data

Dec. 21, 1983 [JP] Japan .................. 58-239668

[51] Int. Cl.$^4$ ..................... B32B 27/08; B32B 27/36
[52] U.S. Cl. ..................... 428/516; 428/518; 428/520; 428/412; 428/483; 428/414; 428/313.5
[58] Field of Search ................... 428/516, 518, 520

[56] References Cited

U.S. PATENT DOCUMENTS

| | | | |
|---|---|---|---|
| 3,558,330 | 1/1971 | Widiger et al. | 426/127 |
| 3,874,987 | 4/1975 | Young | 428/518 X |
| 4,376,799 | 3/1983 | Tusim | 428/518 X |
| 4,430,477 | 2/1984 | Kunimune | 525/70 |

*Primary Examiner*—P. C. Ives
*Attorney, Agent, or Firm*—Sherman and Shalloway

[57] ABSTRACT

An improved laminated structure comprised of two adjoining layers of synthetic resin laminated through a layer of a post-halogenated adhesive olefin resin of an alpha-olefin having 2 to 8 carbon atoms. The post-halogenated adhesive olefin resin has a halogen content of 0.1 to less than 10% by weight based on its own weight and a crystallinity, determined by the X-ray diffraction method, of 5 to 30%, and is obtained by the post-halogenation of an unhalogenated olefin resin having a crystallinity, determined by the X-ray diffraction method, of 10 to 45%.

17 Claims, No Drawings

LAMINATED STRUCTURE HAVING POST-CHLORINATED ADHESIVE OLEFIN RESIN LAYER

This invention relates to an improved laminated structure obained by laminating adjoining two layers of synthetic resin, for example layers of a chlorine-containing synthetic resin such as a vinyl chloride resin and a vinylidene chloride resin to each other, layers of an aromatic synthetic resin having a benzene ring such as an aromatic polyester resin, a polycarbonate resin, a polystyrene resin and a polyphenylene oxide resin to each other, a layer of the chlorine-containing synthetic resin to a layer of the aromatic synthetic resin, or a layer of such a resin to a layer of an olefin resin through a layer of post-halogenated adhesive olefin resin layer of an alpha-olefin having 2 to 8 carbon atoms.

Particularly, the invention relates to a laminated structure having a post-halogenated adhesive olefin resin layer, in which the post-halogenated olefin resin, in spite of its relatively low halogen content, can exhibit excellent improved adhesive property at relatively low temperatures while circumventing its coloration or degradation that may be caused by dehydrohalogenation.

More specifically, this invention pertains, in a laminated structure comprised of two adjoining layers of synthetic resin laminated through a layer of a post-halogenated adhesive olefin resin of an alpha-olefin having 2 to 8 carbon atoms, to the improvement wherein said post-halogenated adhesive olefin resin has a halogen content of 0.1 to less than 10% by weight based on its own weight and a crystallinity, determined by the X-ray diffraction method, of 5 to 30%, and is obtained by the post-halogenation of an unhalogenated olefin resin having a crystallinity, determined by the X-ray diffraction method, of 10 to 45%.

Chlorine-containing synthetic resins such as vinyl chloride resins and vinylidene chloride resins, and aromatic synthetic resins such as aromatic polyester resins, aromatic polycarbonate resins, polystyrene resins and polyphenylene oxide resins are widely used as food containers, packaging materials, daily sundries, automobile interior finishing materials, building materials and industrial materials. In uses which require chemical resistance, water resistance at ordinary and elevated temperatures, and gas barrier property, attempts have been made to laminate an olefin resin such as polyethylene or polypropylene to the aforesaid chlorine-containing synthetic resins or aromatic synthetic resins. But no adhesive has yet been developed which has satisfactory superior adhesive property for such a purpose.

If an adhesive olefin resin such as an olefin resin containing epoxy groups is used as an adhesive for the lamination of a layer of a polyolefin to a layer of a chlorine-containing synthetic resin or an aromatic synthetic resin, no excellent adhesive property can be obtained.

It has generally been known that a post-halogenated olefin resin, particularly post-chlorinated polyethylene, can be used as an adhesive for layers of the synthetic resins as exemplified above.

For example, Japanese Patent Publication No. 18891/1962 (published Dec. 2, 1962) proposes a process for producing a synthetic resin container. This patent document discloses a technique of melt-bonding a film or sheet of a vinyl halide polymer or vinylidene halide polymer to a polyolefin film or sheet whose surface is halogenated by exposure to chlorine gas at room temperature for several minutes. This patent document only discloses the surface modification of an already shaped polyolefin film or sheet. Furthermore, it does not at all refer to the crystallinity of the starting polyolefin, the crystallinity of the halogenated polyolefin and its halogen content.

Japanese Patent Publication No. 47292/1972 (published on Nov. 29, 1972) discloses adhesive olefin resins useful for heat-bondin9 synthetic resins, natural fibers, glass, metals, etc. in arbitrary combinations. This patent document describes a hot-melt-adhesive composed of 100 parts by weight of substantially amorphous post-chlorinated polyethylene having a chlorine content of 30 to 60% by weight obtained by chlorinating high-density polyethylene at a temperature of at least 100° C. and 0.5 to 5 parts by weight of an organic peroxide. The patent document states that high-density polyethylene having a molecular weight of 50,000 to 500,000 is preferred as the starting polyethylene, and from the viewpoint of processability and adhesion strength, the chlorine content of amorphous post-chlorinated polyethylene is adjusted to at least 30% by weight. It does not at all refer to the crystallinity of the starting polyolefin leading to the post-chlorinated polyethylene, and discloses the use of post-chlorinated polyethylene having a chlorine content of at least 30% by weight far exceeding the halogen content specified in the present invention.

Japanese Patent Publication No. 35091/1975 (published on Nov. 13, 1975) discloses a composition for coating a polypropylene molded article whose main component is a post-chlorinated amorphous propylene/ethylene copolymer obtained by chlorinating amorphous propylene/ethylene copolymer which does not substantially contain a solvent and has an intrinsic viscosity of 0.3 to 1.5 dl/g and in which the content of copolymerized ethylene is 2 to 30% by weight (about 3.1 to 39 mole %) until its chlorine content reaches 5 to 35% by weight. The composition includes post-chlorinated propylene/ethylene copolymer having a relatively low chlorine content, but the use of amorphous propylene/ethylene copolymer is required as a starting material. Thus, this patent document requires the use of, as the starting material, an amorphous copolymer which is contradictory to a crystalline propylene/ethylene copolymer, particularly to one having a crystallinity of 10 to 45% as specified in the present invention.

U. S. Pat. No. 3,549,389 (corresponding to Japanese Patent Publication No. 41667/1976) discloses layered barrier packaging films useful for food packaging and the like. Table 3 of this U.S. patent shows an example of using a layer of post-chlorinated polyethylene (sample No. 55) designated by symbol Y. The note to Table 3 shows that symbol Y represents chlorinated polyethylene containing 35 weight percent chlorine, 1.3 percent crystalline. This patent document neither refers to the crystallinity of the starting olefin resin, and there is used post-chlorinated polyethylene having a chlorine content of 35% by weight which far exceeds the halogen content specified in the present invention.

Japanese Patent Publication No. 1710/1983 (published Jan. 12, 1983) discloses a method for bonding a polyester resin to a polyester resin or another substrate, which is characterized by using as an adhesive a resin composition comprising 10 to 300 parts by weight of chlorinated polyethylene and 100 parts by weight of a carboxy-modified ethylene/vinyl acetate copolymer obtained by reacting an ethylene/vinyl acetate copolymer with an alpha,beta-unsaturated carboxylic acid or its acid anhydride in the molten state in the presence of a radical initiator. This patent document states that the chlorinated polyethylene desirably has a chlorine content of 20 to 50 percent by weight, and outside this range of the chlorine content, sufficient adhesion strength cannot be obtained. This patent document does not at all refer to the crystallinity of the starting olefin resins, and there is used post-chlorinated polyethylene having a chlorine content which far exceeds the halogen content specified in the present invention.

Japanese Laid-Open Patent Publication No. 81379/1981 (July 3, 1981) discloses an adhesive resin for use in bonding a polyvinyl chloride-containing resin to polyethylene, which comprises chlorinated polyethylene containing 10 to 50% by weight of chlorine or a polymer blend comprising the chlorinated polyethylene as a main component. The patent document states that if the chlorine content is outside the above range, the chlorinated polyethylene does not adhere to at least one of the polyvinyl chloride-containing resin and polyethylene. It shows an example of using post-chlorinated polyethylene having a chlorine content of 30 and 40% by weight. It neither refers to the crystallinity of the starting olefin resin as specified in the present invention, and in examples of actual use, it only discloses post-chlorinated polyethylene having a chlorine content far exceeding the halogen content specified in the present invention.

Japanese Laid-Open Patent Publication No. 65767/1982 (laid open on Apr. 21, 1982) describes a method of bonding a polyester resin to a polyester resin or another substrate, which is characterized by using as an adhesive a resin composition comprising 100 parts by weight of an ethylene/vinyl acetate copolymer and/or its saponification product and 10 to 300 parts by weight of chlorinated polyethylene. This patent document, as does the above-cited Japanese Patent Publication No. 1710/1983, states that chlorinated polyethylene having a chlorine content of 20 to 50% by weight is desirable, and outside this range, sufficient adhesion strength cannot be obtained. It neither refers to the crystallinity of the starting olefin resin as specified in this invention, and there is used a post-chlorinated polyethylene having a chlorine content far exceeding the halogen content specified in the present invention.

Japanese Patent Publication No. 37688/1975 (published on Dec. 4, 1975) discloses an adhesive resin for polyolefin molded articles, comprising as a main ingredient a post-chlorinated propylene/ethylene copolymer obtained by chlorinating a propylene/ethylene copolymer having an ethylene content of 2 to 15% by weight (about 3.1 to 21.7 mole %). The patent document describes that the degree of chlorination of the post-chlorinated propylene/ethylene copolymer is 20 to 40% by weight, preferably 22 to 35% by weight, and teaches that if the degree of chlorination is lower than the specified limit, the processability of the adhesive resin is poor, and on standing, the adhesive resin undergoes gellation and becomes useless, and that when the degree of chlorination exceeds the specified upper limit, the adhesive resin decreases in adhesion strength and is of no value for practical purposes. It neither refers to the crystallinity of the starting olefin resin specified in the present invention, and there is used a post-chlorinated propylene/ethylene copolymer having a chlorine content far exceeding the halogen content specified in the present invention.

As stated above with reference to the prior art relating to post-chlorinated adhesive olefin resins, in the technical background before the priority date of the present application excepting the proposal of the above-cited Japanese Patent Publication No. 35091/11975 which teaches the use of the post-chlorinated amorphous propylene/ethylene copolymer obtained by post-chlorinating amorphous propylene/ethylene copolymer, the crystallinities of the starting polyolefins, particularly polyethylene, were usually on the order of 55 to 85%. It can be understood from this that in order to impart the desired adhesiveness by fully decreasing the crystallinity of the starting olefin resin, it should be post-chlorinated until the chlorine content of the resulting post-chlorinated olefin resin becomes fairly high.

Accordingly, this is disadvantageous in respect of both cost and operation. Furthermore, investigations of the present inventors have shown that when two adjoining layers are heat-bonded with the post-chlorinated adhesive olefin resin layer having such a relatively high chlorine content interposed between the two layers and/or when a pre-formed layer of the post-chlorinated adhesive olefin resin is molded under heat, the dehydrohalogenation (dehydrochlorination) of the post-chlorinated adhesive olefin resin tends to occur, and this disadvantageously leads to the coloration or degradation of the adhesive olefin resin layer.

It has been considered that if an attempt is made to utilize a post-halogenated olefin resin having a relatively low halogen content in order to eliminate the defect of dehydrohalogenation, the crystalline portion of the olefin resin remains unless an amorphous resin is used as the starting olefin resin as in the above-cited Japanese Patent Publication No. 35091/1975, and that therefore, hot-melt-bonding of this resin to another material at relatively low temperatures leads to unsatifactory adhesiveness or even to a lack of adhesiveness, and the post-halogenated olefin resin containing a crystalline portion has poor adhesiveness and cannot find practical usage.

The present inventors have made investigations in order to solve the aforesaid technical problems in the post-chlorinated adhesive olefin resins and to provide a laminated structure having improved properties and comprising two adjoining layers of synthetic resin laminated through a layer of a post-halogenated adhesive olefin resin of an alpha-olefin having 2 to 8 carbon atoms. These investigations have led to the discovery that a post-halogenated adhesive olefin resin having a specific halogen content and a specific low crystallinity and obtained by post-halogenation of a starting unhalogenated olefin resin having a specific crystallinity, in spite of its low halogen content, exhibits excellent improved adhesive property even at relatively low temperatures while circumventing the aforesaid coloration or degradation of the adhesive olefin resin that may be caused by dehydrohalogenation.

The investigations of the present inventors have shown that a post-halogenated olefin resin having a halogen content of 0.1 to less than 10% by weight based on its own weight and a crystallinity, determined by the X-ray diffraction method, of 5 to 30%, and obtained by post-halogenation of an unhalogenated olefin resin having a crystallinity, determined by the X-ray diffraction method, of 10 to 45% shows excellent adhesive property as well as the aforesaid improved properties contrary to what is expected from the prior art techniques discussed hereinabove.

It is an object of this invention to provide an improved laminated structure having a layer of a post-halogenated adhesive olefin resin of an alpha-olefin as an adhesive layer.

The above and other objects and advantages of this invention will become more apparent from the following description.

The laminated structure of this invention comprising two adjoining layers of synthetic resins laminated through a layer of a post-halogenated adhesive olefin resin of an alpha-olefin having 2 to 8 carbon atoms is characterized in that:

the adhesive olefin resin is (B) a post-halogenated olefin resin having a halogen content of 0.1 to less than 10% by weight based on its own weight and a crystallinity, determined by the X-ray diffraction method, of 5 to 30%, and the post-halogenated olefin resin (B) is obtained by post-halogenation of (A) an unhalogented olefin resin having a crystallinity, determined by the X-ray diffraction method, of 10 to 45%.

The unhalogenated olefin resin (A) preferably has a crystallinity of 10 to 30%. If the crystallinity of the resin (A) is too high beyond the above range, the post-halogenated olefin resin (B) derived from the resin (A) does not show satisfactory adhesive property. To improve adhesiveness, the halogen content of the post-halogenated olefin resin has to be made higher than the halogen content of the resin (B) specified above, and the aforesaid trouble of coloration or degradation is difficult to avoid in using it as the adhesive olefin resin.

The crystallinity is determined by the X-ray diffraction method at 23° C. on a 1 mm-thick press sheet sample using an X-ray diffraction device (RU-200-PL, supplied by Rigaku Denki Co., Ltd.). From the diffraction intensity of the crystalline portion (peak area, Acr) and the diffraction intensity of the amorphous portion (peak area, Aam) in the X-ray diffraction spectrum of the sample, the crystallinity is calculated as follows:

$$\text{Crystallinity (\%)} = \frac{Acr}{Aam + Acr} \times 100$$

Examples of the starting resin (A) of an alpha-olefin having 2 to 8 carbon atoms are homopolymers of alpha-olefins having 4 to 8 carbon atoms, copolymers of at least two different alpha-olefins having 2 to 8 carbon atoms, and copolymers of alpha-olefins having 2 to 8 carbon atoms with up to 3 mole % of diolefins. Examples of the alpha-olefin having 2 to 8 carbon atoms are ethylene, propylene, 1-butene, 1-hexene, 1-octene and 4-methyl-1-pentene. Examples of the diolefins are butadiene, pentadiene, isoprene, piperylene, dicyclopentadiene, 5-ethylidene-2-norbornene and 5-vinyl-2-norbornene. Specific examples of the unhalogenated olefin resin (A) are homopolymers of alpha-olefins having 4 to 8 carbon atoms such as poly-1-butene and poly(4-methyl-1-pentene); copolymers of ethylene with alpha-olefins having 3 to 8 carbon atoms, such as ethylene/propylene copolymer, ethylene/butene copolymer and propylene/butene copolymer; and copolymers of ethylene and dienes or copolymers of ethylene, alpha-olefins having 3 to 8 carbon atoms and dienes, such as ethyene/propylene/1,4-hexadiene copolymer, ethylene/propylene/dicyclopentadiene copolymer, ethylene/propylene/5-ethylidene-2-norbornene copolymer, ethylene/1-butene/5-ethylidene-2-norbornene copolymer, ethylene/1-butene/ dicyclopentadiene copolymer, ethylene/dicyclopentadiene copolymer, and ethylene/butadiene copolymer.

Such starting resins (A) and methods for their production are well known, and such resins are also commercially available. For example, the starting olefin resins (A) may be obtained by a well known conventional method, for example by (co)polymerizing the aforesaid olefins or diolefins using vanadium catalysts or titanium catalysts containing magnesium, titanium and halogen.

The resin (A) may also be a copolymer obtained by radical copolymerization by the high-pressure method of ethylene with a polar monomer such as vinyl acetate, acrylic or methacrylic acid or an alkyl acrylate or methacrylate, or a saponification product or a neutralization product of the copolymer. Such resins (A) and methods for production thereof are also known, and these resins are also commercially available. Specific examples of such resins (A) include ethylene/vinyl acetate copolymer, a saponification product of ethylene/vinyl acetate copolymer, ethylene/acrylic acid copolymer, ethylene/methacrylic acid copolymer, ethylene/methacrylic acid copolymer, a neutralization product of ethylene/acrylic acid copolymer, a neutralization product of ethylene/methacrylic acid copolymer, ethylene/methyl acrylate copolymer, ethylene/methyl methacrylate copolymer and a saponification product of ethylene/methyl methacrylate copolymer. Graft copolymers obtained by grafting unsaturated compounds having a carbon-carbon double bond such as maleic anhydride or (meth)acrylic acid to the resins (A) can also be used as starting olefin resins.

The adhesive olefin resin forming the layer of the post-halogenated adhesive olefin resin is a post-halogenated olefin resin having a halogen content of 0.1 to less than 10% by weight, preferably 0.5 to 7% by weight, more preferably 1 to 6% by weight, based on its own weight, and a crystallinity, determined by the X-ray diffraction method, of 5 to 30%, preferably 10 to 30%. If the halogen content is less than 0.1% by weight, sufficient adhesion strength which is the effect of the post-halogenated adhesive olefin resin in this invention cannot be obtained. Halogen contents of 10% by weight or higher should be avoided because they cause the foresaid coloration or degradation. Furthermore, such higher halogen contents beyond the upper limit specified are disadvantageous both as to processability and cost.

The post-halogenation may, for example, be post-chlorination and post-bromination, the post-chlorination being particularly preferred.

The technique of post-halogenating the starting resin (A) is known as is disclosed in the prior art references discussed hereinabove, and such known techniques can be used in this invention. For example, there may be used a method which comprises pulverizing the starting resin (A) into small particles, suspending the particles in water, and contacting the suspension with molecular chlorine at a temperature of, for example, about 70° to 90° C.; a method which comprises dissolving the starting resin (A) in an organic solvent stable to chlorine, such as carbon tetrachloride, tetrachloroethylene and chlorobenzene and contacting the resulting uniform solution with molecular chlorine at a temperature of, for example, about 0° to 150° C.; or a method which comprises kneading a chlorine compound capable of liberating chlorine upon heating, such as N-chloroacetamide, N-chlorosuccinimide, N-bromosuccinimide or 1,3-dichloro-5,5-dimethylhydantoin into the starting resin (A) by a roll or a Banbury mixer, and heating the kneaded mixture at a temperature at which the halogen compound liberates halogen. Halogenation in aqueous suspension or in solution is particularly preferred. More preferably, halogenation in solution is carried out in the presence of a radical initiator or under irradiation of ultraviolet light or visible light because the reaction proceeds efficiently. Examples of the radical initiator are organic peroxides such as benzoyl peroxide, dichlorobenzoyl peroxide, dicumyl peroxide, di-tert-butyl peroxide, 2,5-dimethyl-2,5-di(peroxybenzoate)hexyne-3, 1,4-bis(tert-butylperoxyisopropyl)benzene and lauroyl peroxide; organic peresters such as tert-butyl peracetate, 2,5-dimethyl-2,5-di(tert-butylperoxy)hexyne-3, 2,5-dimethyl-2,5-di(tert-butylperoxy)hexane, tert-butyl perbenzoate, tert-butyl perphenylacetate, tert-butyl perisobutyrate, tert-butyl per-sec-octoate, tert-butyl perpivalate, cumyl per pivalate and tert-butyl perdiethylacetate; and other azo compounds such as azosibisobutyronitrile and dimethyl azoisobutyrate. Of these, dicumyl peroxide, di-tert-butyl peroxide, and benzoyl peroxide are preferred.

The amount of the radical initiator can be properly selected. For example, it is about 0.001 to 1.0 by weight based on the weight of the starting resin (A).

The degree of chlorination can be properly selected and regulated depending upon the amount of molecular chlorine or other chlorinating agents, the reaction time, the reaction temperature, etc.

In the laminated structure of this invention, the layer of the post-halogenated adhesive olefin resin (B) may be composed only of the resin (B), but may, as required, contain other additives in amounts which do not impair its excellent adhesive property. Such additives include antioxidants, ultraviolet absorbers, antistatic agents, pigments, dyes, nucleating agents, fillers, slip agents, lubricants, fire retardants, anti-blocking agents, hydrochloric acid absorbing agents and plasticizers.

Examples of the antioxidants are 2,6-di-t-butyl-p-cresol, o-t-butyl-p-cresol, tetrakis-[methylene-3-(3,5-di-t-butyl-4-hydroxyphenyl)propionate]methane, beta-naphthylamine and p-phenylenediamine.

Examples of the ultraviolet absorbers are 2,4-dihydroxybenzophenone, 2-(2′-hydroxy-3′,5′-di-t-butylphenyl)-5-chlorobenzotriazole, 2-(2-hydroxy-3-t-butyl-5-methylphenyl)-5-chlorobenzotriazole and bis(2,2′,6,6′-tetramethyl-4-piperidine)sebacate.

Examples of the antistatic agents are lauryl diethanolamine, palmityl diethanolamine, stearyl diethanolamine, oleyl diethanolamine, behenyl diethanolamine, polyoxyethylene alkylamines, stearyl monoglyceride, and 2-hydroxy-4-n-octoxybenzophenone.

Examples of colorants including pigments and dyes are carbon black, titanium white, cadmium yellow and copper phthalocyanine blue.

Examples of the nucleating agents are aluminum p-tert-butylbenzoate, dibenzylidene sorbitol and aluminum hydroxy-di-p-t-butylbenzoate.

Examples of the fillers are glass fibers, carbon fibers, talc, clay, silica, calcium carbonate, barium sulfate, magnesium hydroxide, calcium hydroxide and calcium.

Examples of the slip agents are stearamide, oleamide and erucamide.

Examples of the lubricants are calcium stearate, zinc stearate, aluminum stearate, magnesium stearate, and polyethylene wax.

Examples of the fire retardants are antimony oxide, decarbromobiphenyl ether, and bis(3,5-dibromo-4-bromopropyloxyphenyl)sulfone.

An example of the antiblocking agents is silicon dioxide.

Examples of the hydrochloric acid absorbing agents are metal salts of stearic acids, epoxidized soybean oil, a combination of tribromo ortho-phosphate and tetrasodium pyrophosphate, 4′-tert.butylphenyl salicylate, a combination of tetrasodium pyrophosphate and disodium o-phosphate, and pyrophosphates, orthophosphates and phosphites of alkali metals.

Examples of the plasticizers are methyl phthallyl ethylene glycollate, ethyl phthallyl ethyl glycollate, 3-(2-xenoxy)-1,2-epoxypropane, di-(alphaphenylethyl)ether, lower esters of phthalic acid such as dibutyl phthalate, and esters of adipic acid and sebacic acid.

The amounts of these additives may be selected from suitable ones which do not adversely affect the objects of this invention. For example, based on the weight of the post-halogenated adhesive olefin resin (B), the suitable amounts are about 0.01 to about 5% by weight for the antioxidants; about 0.01 to about 5% by weight for the ultraviolet absorbers; about 0.01 to about 1% by weight for the antistatic agents; about 0.01 to about 5% by weight for the coloring agents; about 0.01 to about 5% by weight for the nucleating agents; about 0.1 to about 60% by weight for the fillers; about 0.01 to about 1% by weight for the slip agents; about 0.01 to about 1% by weight for the lubricants; about 0.1 to about 50% by weight for the fire retardants; and about 0.01 to about 30% by weight for the antiblocking agents; about 0.01 to about 5% by weight for the hydrochloric acid absorbing agents; and about 0.01 to about 5% by weight for the plasticizers.

The laminated structure of this invention is of such a structure that two adjoining layers X and Y of synthetic resin are laminated through the layer of the post-halogenated adhesive olefin resin (B) described above. In the laminated structure, a layer of another synthetic resin may further be laminated to the outside synthetic resin layer X and/or Y.

The kinds of resins which constitute the synthetic layers X and Y can be properly selected. For example, there can be mentioned a combination of layers of a chlorine-containing synthetic resin with each other, a combination of layers of an aromatic synthetic resin with each other, and a combination of a layer of a chlorine-containing synthetic resin with a layer of an aromatic synthetic resin. Preferably, the combination of the chlorine-containing synthetic resin layer and the olefin resin layer and the combination of the aromatic synthetic resin layer and the olefin resin layer are preferred in this invention.

The post-halogenated adhesive olefin resin (B) may be used as a hot melt adhesive or a solution adhesive, the former being preferred. The form of the laminated structure of this invention may be properly selected, and is, for example, a film or a sheet.

Examples of the chlorine-containing synthetic resins utilized in the layer of the chlorine-containing synthetic resin include polymers or copolymers composed mainly of vinyl monomers such as polyvinylidene chloride, polyvinyl chloride, vinylidene chloride/vinyl chloride copolymer, copolymers of vinylidene chloride or vinyl chloride with other unsaturated monomers and polyvinyl chloride to which polar monomers such as vinyl acetate are grafted, chlorine-containing rubbers such as chloroprene, post-chlorinated polymers such as chlorinated polyethylene, chlorinated polypropylene and chlorinated polystyrene, and copolymers having grafted thereto vinyl chloride monomers such as vinylidene chloride and/or vinyl chloride.

The chlorine-containing synthetic resins may be foamed products. Of these, polyvinylidene chloride, polyvinyl chloride, vinylidene chloride/vinyl chloride copolymer, and polyvinyl chloride having a polar monomer grafted thereto are preferred.

Examples of the aromatic synthetic resins having a benzene ring used in the aforesaid aromatic synthetic resin layer include styrene resins such as polystyrene, poly(alpha-methylstyrene), styrene/acrylonitrile copolymer (AS) and styrene/acrylonitrile/butadiene copolymer (ABS); aromatic polycarbonate resins such as polycarbonate of bisphenol A, polycarbonate of bisphenol F and polycarbonate of bisphenol AD; polyphenylene oxide resins such as polyphenylene oxide, modified polyphenylene oxide and grafted polyphenylene oxide; and aromatic polyester resins such as polyethylene terephthalate, polybutylene terephthalate, poly(ethylene terephthalate isophthalate), poly(ethylene 2,6-naphthalenedicarboxylate), polyphenylene terephthalate, bisphenol A/terephthalic acid copolymer and bisphenol a/terephthalic acid/isophthalic acid copolycondensate. These aromatic synthetic resins may be roamed products.

Examples of the resins used in the olefin resin layer are homopolymers of alpha-olefins having 2 to 18 carbon atoms such as ethylene, propylene, 1-butene, 1-pentene, 1-hexene, 4-methyl-1-pentene, 3-methyl-1-pentene, 1-octene, 1-decene and 1-dodecene, and copolymers of two or more of these alpha-olefins. These olefin resins may also have vinyl monomers such as styrene, vinyl acetate, acrylic esters, methacrylic esters and metal acrylates copolymerized therewith. Preferably, the olefin resin has a crystallinity of usually at least 10%, preferably at least 15%. It has an intrinsic viscosity of usually 0.5 to 5 dl/g, preferably 0.7 to 4 dl/g.

Various methods are known for the formation of a laminate from the aforesaid chlorine-containing synthetic resin or the aromatic synthetic resin and the olefin resin by the adhesive of this invention, and such known methods can be used in this invention.

For example, there can be used a multilayer T-die sheet or multilayer film forming method in which the resin components forming the individual layers of the laminate are fed separately into three extruders and the molten resin components are associated into the interior of one die, and a tandem method in which the molten resin components are heat-fused outside the die. The thickness of the layer of the olefin resin is arbitrary, and may, for example, be 5 microns to 50 mm, preferably 10 microns to 40 mm. The thickness of the post-halogenated adhesive olefin resin layer in this invention is arbitrary, and may, for example, be 1 to 500 microns, preferably 2 to 100 microns.

The following examples illustrate the present invention more specifically. The properties of the post-halogenated olefin resin (B) and the starting unhalogenated olefin resin (A) were measured by the following methods.

(1) Halogen content: About 10 mg of the post-halogenated olefin resin (B) was completely burned in an oxygen flask to cause the halogen moiety to be absorbed as hydrogen halide into water. Then, $AgNO_3$ was added to the resulting aqueous hydrogen halide solution, and a precipitate of silver halide was recovered. The halogen content (% by weight) of the post-halogenated olefin resin was determined by the fluorescent X-ray spectral analysis of the silver halide.

(2) Intrinsic viscosity [$\eta$]: Measured at 135° C. in decalin as a solvent.

(3) Crystallinity: Measured by the X-ray diffraction method by using a device (RV-200-PL, supplied by Rigaku Denki K. K.). cl EXAMPLE 1

One thousand grams of ethylene/propylene copolymer having an intrinsic viscosity of 1.3 dl/g, and ethylene content of 80 mole % and a crystallenity of 15% was dissolved in 19.6 liters of chlorobenzene in an atmosphere of nitrogen in a glass lined reactor. The polymer solution was maintained at 115° C. while being shielded from light, and with stirring at 300 rpm, 100 g of chlorine gas was blown into the polymer solution over 4 hours using a bubbling tube. During the reaction, a solution of 9.68 g of benzoyl peroxide in 400 ml of chlorobenzene was added dropwise (dropped within the first 3 hours of the total reaction period of 4 hours). The reaction was stopped by adding 800 ml of a 2N aqueous solution of sodium hydroxide. The reaction mixture was washed with warm water at 40° C., and a large amount of methanol was added. The polymer was precipitated and collected by filtration. The precipitate was repeatedly washed with methanol, and dried at 40° C. under reduced pressure in an atmosphere of nitrogen to give chlorinated ethylene/propylene copolymer. The resulting copolymer contained 4.5% by weight of chlorine.

The chlorinated ethylene/propylene copolymer was melted in an extruder and fed into a three-layer T-die sheet forming die at a resin temperature of 200° C. Separately, high-density polyethylene ([$\eta$] 1.5 dl/g) and polyvinylidene chloride (SARAN, a trade name for a product of Dow Chemical Co.) were separately melted by other extruders and fed into the above die at a resin temperature of 200° C. to form a three-layer sheet composed of a 50 micron-thick outside layer of high-density polyethylene, a 20 micron-thick interlayer of the chlorinated ethylene/propylene copolymer and a 1 mm-thick inner layer of polyvinylidene chloride.

A test sample, 10 mm wide, was cut off from the three-layer sheet, and partly peeled between the polyvinylidene chloride layer and the chlorinated ethylene/propylene copolymer layer, and the two-layer film portion of the high-density polyethylene and the chlorinated ethylene/propylene copolymer was peeled at 180 degrees. Thus, the peel strength between the polyvinylidene chloride layer and the chlorinated ethylene/propylene copolymer layer was measured. The peel strength was found to be 910 g/cm. The high-density polyethylene layer could not be peeled from the chlorinated ethylene/propylene copolymer layer and the adhesion was sufficiently strong.

A three-layer sheet composed of a 50 micron-thick outer layer of high-density polyethylene, a 20 micron-thick interlayer of chlorinated ethylene/propylene copolymer and a 1 mm-thick inner layer of polystyrene was prepared by the same method as above (the temperatures of the resins were all 200° C.) except that general-purpose polystyrene (Topolex GP-500-51, a tradename for a product of Mitsui Toatsu Chemicals, Inc.) was used instead of the polyvinylidene chloride.

A test specimen, 10 mm width, was cut off from the three-layer film. The sample was partly peeled between the polystyrene layer and the chlorinated ethylene/propylene copolymer layer, and the two-layer film portion of the high-density polyethylene and the chlorinated ethylene/propylene copolymer was peeled at 180 degrees. Thus, the peel strength between the polystyrene layer and the chlorinated ethylene propylene copolymer layer was measured.

filtered, washed three times with 2 liters of warm water at 40° C. over 1 hour, and further with cold water, and then dried at 40° C. under reduced pressure.

A three-layer laminated sheet was prepared and evaluated in the same way as in Example 1 except that the chlorinated ethylene/propylene copolymer obtained by the above aqueous suspension method was used instead of the chlorinated ethylene/propylene copolymer used in Example 1. The results are shown in Table 1.

TABLE 1

| | Unhalogenated ethylene/propylene copolymer (A) | | | Chlorinated ethylene/propylene copolymer (B) | | | Coloration of the chlorinated polymer layer during molding** | Adhesion strength to polyvinylidene chloride (g/cm) | Adhesion strength to polystyrene (g/cm) |
|---|---|---|---|---|---|---|---|---|---|
| Run | Ethylene content (mole %) | [η] (dl/g) | Crystallinity (%) | Chlorine content (wt. %) | [η] (dl/g) | Crystallinity (%) | | | |
| Example | | | | | | | | | |
| 1 | 80 | 1.3 | 15 | 4.5 | 1.2 | 9 | O | 910 | 600 |
| 2 | 80 | 1.3 | 15 | 9.0 | 1.1 | 6 | Δ | 980 | 650 |
| 3 | 80 | 1.3 | 15 | 0.5 | 1.3 | 13 | O | 500 | 300 |
| 4 | 83 | 3.1 | 20 | 5.1 | 1.8 | 11 | O | 850 | 670 |
| 5 | 90 | 1.3 | 45 | 4.8 | 1.1 | 30 | O | 650 | 400 |
| 6* | 80 | 1.3 | 15 | 4.0 | 1.1 | 10 | O | 880 | 550 |
| Comparative Example | | | | | | | | | |
| 1 | 80 | 1.3 | 15 | 0 | 1.3 | 15 | O | No adhesion | No adhesion |
| 2 | 80 | 1.3 | 15 | 0.005 | 1.3 | 15 | O | " | " |
| 3 | 80 | 1.3 | 15 | 17.3 | 1.0 | 2 | X | 500 | 250 |
| 4 | 95 | 1.5 | 60 | 5.0 | 1.3 | 50 | O | 100 | No adhesion |
| 5 | 100 | 1.5 | 70 | 10.3 | 1.2 | 45 | X | 90 | " |
| 6 | 35 | 2.0 | 12 | 15.4 | 1.7 | 2 | X | 450 | 300 |
| 7 | 35 | 2.0 | 12 | 30.1 | 1.4 | 0 | XX | 480*** | 350*** |

*In Example 6, chlorinated was carried out in aqueous suspension, and in other Examples, chlorination was carried out in solution in chlorobenzene.
**XX = black, X = brown, Δ = slightly yellow, O = not colored.
***Partly peeled between polyvinylidene chloride or polystyrene and the propylene/ethylene random copolymer.

As a result, the peel strength was found to be 600 g/cm. Peeling between the high-density polyethylene layer and the chlorinated ethylene/propylene copolymer layer was impossible, and the adhesion was sufficiently strong.

In any of the above molding procedures, the coloration of the chlorinated ethylene/propylene copolymer interlayer due to dehydrochlorination did not occur.

EXAMPLES 2-5 AND COMPARATIVE EXAMPLES 1-7

In each run, a three-layer laminated sheet was produced by the same method as in Example 1 except that each of the chlorinated ethylene/propylene copolymers indicated in Table 1 (in Comparative Example 1, no chlorination reaction was carried out, and in the other examples, chlorination wass carried out in solution in chlorobenzene) was used instead of the chlorinated ethylene/propylene copolymer used in Example 1. The sheet was evaluated in the same way as in Example 1, and the results are summarized in Table 1.

EXAMPLE 6

A mixture composed of 1000 g of ethylene/propylene copolymer (refrigerated and pulverized) having such a size as to pass through a 250-mesh wire gauze, 0.5 g of a nonionic surfactant (Epan 750, a trade name for a product of Daiichi Kogyo Seiyaku K. K.) and 10 liters of water was fed into a 15-liter glass reactor equipped with a stirrer and a thermometer, and heated to 80° C. While light was irradiated onto the exterior of the reactor from a 20 W daylight fluorescent lamp, chlorine gas was introduced into the suspension of the above mixture at a rate of 1.0 g/min., and the chlorination was continued at 80° C. for 150 minutes. The reaction mixture was

EXAMPLES 7-8

A three-layer sheet was prepared in the same way as in Example 1 except that each of the polymers shown in Table 2 was used as the starting olefin resin (A). The results are shown in Table 2. In these examples, no coloration of the adhesive layer during molding was observed.

EXAMPLES 9-11 AND COMPARATIVE EXAMPLES 8-9

A three-layer sheet was prepared in the same way as in Example 1 except that each of the propylene polymers shown in Table 2 was used as the olefin resin (A) and propylene/ethylene random copolymer having an ethylene content of 2 mole % and an intrinsic viscosity of 2.5 dl/g was used as the olefin resin to be bonded to the chlorinated propylene polymer. The adhesion strength between the polyvinylidene layer or the polystyrene layer and the chlorinated propylene polymer layer was measured.

The results are shown in Table 2. In these examples, no coloration of the adhesive layer during molding was observed.

EXAMPLE 12

A three-layer sheet was produced in the same way as in Example 1 except that the chlorinated butene-1/ethylene copolymer was used as an adhesive for polyvinylidene chloride or polystyrene, and polybutene-1 having an intrinsic viscosity of 3.0 dl/g was used as the olefin resin to be bonded to the chlorinated butene-1/ethylene copolymer. The adhesion strength of the sheet was measured as in Example 1.

The results are shown in Table 2. No coloration of the adhesive layer during the molding was observed.

EXAMPLE 13

A three-layer sheet was produced in the same way as in Example 1 except that the chlorinated poly(4-methylpentene-1) indicated in Table 2 was used as an adhesive for polyvinylidene chloride or polystyrene, 4-methylpentene-1 (98 mole %)/decene-1 (2 mole %) copolymer having an intrinsic viscosity of 2.5 dl/g was used as the olefin resin to be bonded to the chlorinated poly(4-methylpentene-1), and the temperatures of the chlorinated poly(4-methylpentene-1) and the 4-methylpentene-1/decene-1 copolymer to be fed into the die were maintained at 260° C.

The adhesion strength of the laminate is shown in Table 2. No coloration of the adhesive layer during molding was observed.

Kanebo Limited) was used instead of polystyrene, and the resin temperature was set at 280, 320 or 270° C., repectively.

The results are shown in Table 3. No coloration of the adhesive layer during the molding was observed in these examples.

TABLE 3

| Example | Adhesion strength of the chlorinated ethylene/propylene copolymer *1 (g/cm) | |
|---|---|---|
| 14 | To polyvinyl chloride | 800 |
| 15 | To vinyl chloride/vinyl acetate copolymer | 700 |
| 16 | To polycarbonate | 1010 |
| 17 | To polyphenylene oxide | 650 |
| 18 | To polyethylene terephthalate | 930 |

*The same polymer as used in Example 1.

TABLE 2

| Example | Unhalogenated polyolefin (A) Composition (mole %) | Crystallinity (%) | Chlorinated polyolefin (B) Chlorine content (wt. %) | Crystallinity (%) | Adhesion strength to polyvinylidene chloride (g/cm) | Adhesion strength to polystyrene (g/cm) |
|---|---|---|---|---|---|---|
| 7 | Ethylene(90)/butene-1(10) copolymer | 17 | 5.1 | 10 | 880 | 750 |
| 8 | Ethylene(96)/vinyl acetate(4) copolymer prepared by the high pressure method | 45 | 5.6 | 28 | 700 | 520 |
| 9 | Propylene(70)/butene-1(30) copolymer | 25 | 4.3 | 14 | 600 | 490 |
| 10 | Propylene(65)/ethylene(35) copolymer | 12 | 7.6 | 6 | 650 | 600 |
| 11 | Propylene(65)/ethylene(35) copolymer | 12 | 3.8 | 8 | 590 | 510 |
| 12 | Butene-1(97)/ethylene(3) copolymer | 40 | 6.0 | 29 | 590 | 480 |
| 13 | Poly(4-methylpentene-1) | 38 | 5.9 | 25 | 600 | 530 |
| Comp. Ex. 8 | Propylene(94)/ethylene(6) copolymer | 35 | 35.2 | 0 | 150* | 120* |
| Comp. Ex. 9 | Propylene(68)/ethylene(32) copolymer | 0 | 7.9 | 0 | 210 | 180 |

*Partly peeled between the polyvinylidene chloride or polystyrene and the propylene/ethylene copolymer.

EXAMPLES 14-15

A three-layer sheet was produced in the same way as in Example 1 except that polyvinyl chloride (Vinyclon 4000-H, a trade name for a product of Mitsui Toatsu Chemicals, Inc.) or vinyl chloride/vinyl acetate copolymer (Nipolite-MH, a trade name for a product of Chisso Corporation; vinyl acetate content 5% by weight) was used instead of polyvinylidene chloride, and the resin temperature was set at 200° C. or 220° C. The peel strength between the chlorinated ethylene/propylene copolymer layer and the polyvinyl chloride layer (Example 14), and the peel strength between the chlorinated ethylene/propylene copolymer layer and the vinyl chloride/vinyl acetate copolymer layer (Example 15) were measured. The results are shown in Table 3. No coloration of the adhesive layer during molding was observed.

EXAMPLES 16-18

A three-layer sheet was produced in the same way as in Example 1 except that polycarbonate (Panlite L-1250, a trade named for a product of Teijin Chemical Co., Ltd.), grafted polyphenylene oxide (Xyron 300 V, a trade name for a product of Asahi-Dow Co., Ltd.) or polyethylene terephthalate (EFG-6, a product of

What is claimed is:

1. In a laminated structure comprised of two adjoining layers of synthetic resin laminated through a layer of a post-halogenated adhesive olefin resin of an alpha-olefin having 2 to 8 carbon atoms, the improvement wherein said post-halogenated adhesive olefin resin has a halogen content of 0.1 to less than 10% by weight based on its own weight and a crystallinity, determined by the X-ray diffraction method, of 5 to 30%, and is obtained by the post-halogenation of an unhalogenated olefin resin having a crystallinity, determined by the X-ray diffraction method, of 10 to 45%.

2. The laminated structure of claim 1 wherein the unhalogenated olefin resin has a crystallinity of 10 to 30%.

3. The laminated structure of claim 1 wherein the post-halogenated olefin resin has a halogen content of 0.5 to 7%.

4. A laminated structure comprising
   (A) a first layer comprising an olefin resin,
   (B) a second layer comprising a chlorine-containing synthetic resin or an aromatic synthetic resin, and
   (C) an adhesive interlayer adjoining layers (A) and (B) and comprising a post-halogenated resing of a non-halogenated alpha-olefin of from 2 to 8 carbon atoms having a crystallinity, determined by the X-ray diffraction method, of 10 to 45%, said post-halogenated resin having a halogen content of from 0.1% to less than 10% by weight, based on the weight of said post-halogenated resin, and a crystallinity, determined by the X-ray diffraction method, of 5 to 30%.

5. The laminated structure of claim 4 wherein the non-halogenated olefin resin has a crystallinity of 10 to 30%, and the post-halogenated olefin resin has a halogen-content of 0.5 to 7%.

6. The laminated structure of claim 4 wherein the alpha-olefin resin is a homopolymer of an alpha-olefin having from 4 to 8 carbon atoms.

7. The laminated structure of claim 4 wherein the alpha-olefin resin is a copolymer of at least two different alpha-olefins each having 2 to 8 carbon atoms or a copolymer of at least one alpha-olefin having 2 to 8 carbon atoms with up to 3 mole % of a diolefin.

8. The laminated structure of claim 4 wherein the alpha-olefin resin is a copolymer of ethylene with a polar monomer.

9. The laminated structure of claim 4 wherein the halogen is chlorine.

10. The laminated structure of claim 4 wherein the first layer (A) is a homopolymer of an alpha-olefin having from 2 to 18 carbon atoms or a copolymer of two or more of said alpha-olefins and optionally with a copolymerizable vinyl monomer.

11. The laminated structure of claim 10 wherein the olefin resin layer (A) has a crystallinity of at least 10% and an intrinsic viscosity of from 0.5 to 5 dl/g.

12. The laminated structure of claim 4 wherein the second layer (B) is the chlorine-containing synthetic resin.

13. The laminated structure of claim 12 wherein the chlorine-containing synthetic resin is selected from the group consisting of polyvinylidene chloride, polyvinyl chloride, vinylidene chloride/vinyl chloride copolymer, copolymers of vinylidene chloride or vinyl chloride with another unsaturated monomer and polyvinyl chloride graft modified with a polar monomer.

14. The laminated structure of claim 13 wherein the adhesion strength between the adhesive interlayer (C) and the second layer (B) is at least 500 g/cm.

15. The laminated structure of claim 4 wherein the second layer (B) is the aromatic synthetic resin.

16. The laminated structure of claim 15 wherein the aromatic synthetic resin is selected from the group consisting of styrene resins, aromatic polycarbonate resins, polyphenylene oxide resins and aromatic polyester resins.

17. The laminated structure of claim 15 wherein the adhesion strength between the adhesive interlayer (C) and the second layer (B) is at least 300 g/cm.

* * * * *